US009111431B2

(12) United States Patent
Wu et al.

(10) Patent No.: US 9,111,431 B2
(45) Date of Patent: Aug. 18, 2015

(54) ALARM SYSTEM PROVIDING TAMPER DETERRENT SIGNALLING AND METHOD

(75) Inventors: Xiang Wu, Toronto (CA); Jitendra Patel, Mississauga (CA); Rajeshwar D. Bishundeo, Concord, CA (US)

(73) Assignee: Tyco Safety Products Canada Ltd., Concord (CA)

( * ) Notice: Subject to any disclaimer, the term of this patent is extended or adjusted under 35 U.S.C. 154(b) by 0 days.

(21) Appl. No.: 13/881,089

(22) PCT Filed: Aug. 25, 2011

(86) PCT No.: PCT/CA2011/000947

§ 371 (c)(1), (2), (4) Date: Apr. 23, 2013

(87) PCT Pub. No.: WO2012/058747

PCT Pub. Date: May 10, 2012

(65) Prior Publication Data

US 2013/0207802 A1 Aug. 15, 2013

Related U.S. Application Data

(60) Provisional application No. 61/410,397, filed on Nov. 5, 2010.

(51) Int. Cl.

| | |
|---|---|
| ***G08B 23/00*** | (2006.01) |
| ***G08B 29/00*** | (2006.01) |
| ***G08B 13/00*** | (2006.01) |
| ***G08B 25/00*** | (2006.01) |
| ***H04M 11/04*** | (2006.01) |
| ***G08B 25/10*** | (2006.01) |
| *G08B 27/00* | (2006.01) |
| *G08B 29/16* | (2006.01) |

(52) U.S. Cl.

CPC ............ *G08B 25/008* (2013.01); *G08B 25/001* (2013.01); *G08B 25/002* (2013.01); *G08B 25/10* (2013.01); *G08B 27/00* (2013.01); *G08B 29/16* (2013.01)

(58) Field of Classification Search

CPC .. G08B 25/001; G08B 25/008; G08B 25/002; G08B 19/00; G08B 21/00; G08B 23/00; G08B 25/006; G08B 27/00; G08B 21/02; G08B 25/014; G08B 25/009; G08B 25/14; G08B 29/04; G08B 29/16

USPC .............. 340/528, 506, 541, 539.1, 527, 565, 340/539.14, 426.13, 426.1, 539.22, 426.18, 340/463, 514, 692, 521, 287, 304; 714/25, 714/36, 37, 39; 379/37, 38, 45; 455/404.1, 455/414.1, 414.14

See application file for complete search history.

(56) References Cited

U.S. PATENT DOCUMENTS

| | | | | |
|---|---|---|---|---|
| 5,801,625 | A * | 9/1998 | Wang | 340/506 |
| 6,069,655 | A * | 5/2000 | Seeley et al. | 348/154 |
| 7,239,236 | B1 * | 7/2007 | Britton | 340/514 |
| 7,817,029 | B1 * | 10/2010 | Hillenburg et al. | 340/501 |
| 2006/0181408 | A1 * | 8/2006 | Martin | 340/528 |
| 2009/0273463 | A1 * | 11/2009 | Morwood et al. | 340/514 |
| 2013/0009771 | A1 * | 1/2013 | Simon et al. | 340/539.1 |

OTHER PUBLICATIONS

International Search Report & Written Opinion mailed Dec. 14, 2011, in related PCT Patent Application No. PCT/CA2010/00947.

* cited by examiner

*Primary Examiner* — Mirza Alam

(57) ABSTRACT

An alarm system at a premises reduces the overall delay in signalling an alarm condition in the presence of an entry delay timer. The alarm system establishes, or commences the establishment of, a network connection prior to the expiry of the entry delay. This allows an alarm message to be quickly dispatched upon expiry of the entry delay timer, or if a tamper condition is sensed.

14 Claims, 4 Drawing Sheets

ALARM SYSTEM PROVIDING TAMPER DETERRENT SIGNALLING AND METHOD

CROSS-REFERENCE TO RELATED APPLICATIONS

The present application is a U.S. National Stage Application under 35 U.S.C. §371 of International Application No.: PCT/CA2011/000947, filed Aug. 25, 2011, the complete disclosure of which is incorporated herein by reference. This application claims benefits from U.S. Provisional Patent Application No. 61/410,397 filed Nov. 5, 2010, the contents of which are hereby incorporated herein by reference.

FIELD OF THE INVENTION

The present invention relates generally to alarm systems, and more particularly to alarm systems that are able to more effectively signal alarm conditions in case of tampering with the alarm system.

BACKGROUND OF THE INVENTION

It is common for businesses and homeowners to have a security system for detecting alarm conditions at their premises and signalling these to a monitoring station. One of the primary functions of the monitoring station is to notify a human operator when one or more alarm conditions have been sensed by detectors installed at a monitored premise.

At the premises, an alarm condition may be initially sensed by a detector. Detectors may vary from relatively simple hard-wired detectors, such as door or window contacts to more sophisticated battery operated ones, such as motion and glass break detectors. The detectors may all report to an alarm control panel at the premises. The panel, in turn, may signal the sensed alarm condition to the monitoring station. Personnel at the monitoring station may respond to the signalled alarm condition. They may, for example, call the premises, or dispatch emergency personnel.

Typically, common points of entry and exit at the premises, such as the front, side and rear doors of a premises, are monitored by detectors. At the premises, the alarm system may be armed and disarmed, for example, by entering a numeric or alphanumeric code at a keypad proximate these points of entry. To prevent signalling authorized entries, most alarm systems are programmed to provide an entry delay for events sensed by detectors proximate the keypads. In this way, an authorized entrant is given a reasonable time interval within in which to disarm the alarm system before the monitoring station is notified of an alarm condition.

Unfortunately, unauthorized entrants often exploit this entry delay. They break-in to a premises through a common point of entry and disable the alarm system during the entry delay, by disconnecting, damaging, destroying or otherwise tampering with the control panel, or other infrastructure.

Accordingly, there remains a need for alarm systems and methods that are less susceptible to tampering in the presence of an entry delay interval.

SUMMARY OF THE INVENTION

Exemplary of an embodiment of the present invention, an alarm system at a premises, reduces the overall delay in signalling an alarm condition in the presence of an entry delay timer. The system may accomplish this by establishing, or commencing the establishment of, a network connection prior to the expiry of the entry delay. This allows an alarm message to be quickly dispatched upon expiry of the entry delay timer, or if a tamper condition is sensed. As establishment of a network connection to signal the alarm could take thirty seconds or more, the connection may be established during time that would conventionally form part of the entry delay interval. The connection may be ready immediately after the entry delay timer expires, or earlier in case of tamper. As required the conventional delay interval could be reduced to take into account the time to establish the connection. Reducing the overall delay (i.e. delay introduced by establishing the network connection+entry delay timer) increases the likelihood that an alarm message may be signalled if the alarm system or infrastructure has been, or is being, tampered with after unauthorized entry.

In accordance with an aspect of the present invention, there is provided a method of signalling a sensed alarm condition from an alarm system at a premises to a monitoring station. The method comprises: upon sensing the alarm condition, establishing a communications connection over a network to an alarm monitoring station, without dispatching a message signalling the alarm condition; determining if the sensed alarm condition should only be signaled after a delay to allow disarming of the alarm; and upon expiry of the delay and if the system has not been disarmed, dispatching a signal indicative of the sensed condition to the alarm monitoring station over the connection, which has previously been established.

In accordance with another aspect of the present invention, there is provided method of operating an alarm system at a premises. The method comprises: sensing an alarm event associated with an entry delay; upon sensing the alarm event, commencing an alarm message dispatch procedure that includes establishing a communications connection over a data network to an alarm monitoring station, without dispatching a message conclusively signalling the alarm event, and initiating an entry delay timer; and aborting the alarm dispatch procedure prior to dispatching a message conclusively signalling the alarm event, if the alarm system disarmed in the prior to expiry of the entry delay timer.

In accordance with yet another aspect of the present invention, there is provided an alarm system for sensing and signalling sensed alarm conditions at a premises. The alarm system comprises: at least one detector for sensing an alarm condition; a panel in communication with the at least one detector, the panel comprising at least one processor and a network interface, the panel operable to: upon sensing the alarm event, establish a communications channel with an alarm monitoring station, without dispatching a message signalling the alarm condition; determine if the sensed condition should only be signaled after a delay to allow disarming of the alarm; and upon expiry of the delay and if the system has not been disarmed, dispatch a signal indicative of the sensed condition to the alarm monitoring station over the communications channel, which has previously been established.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
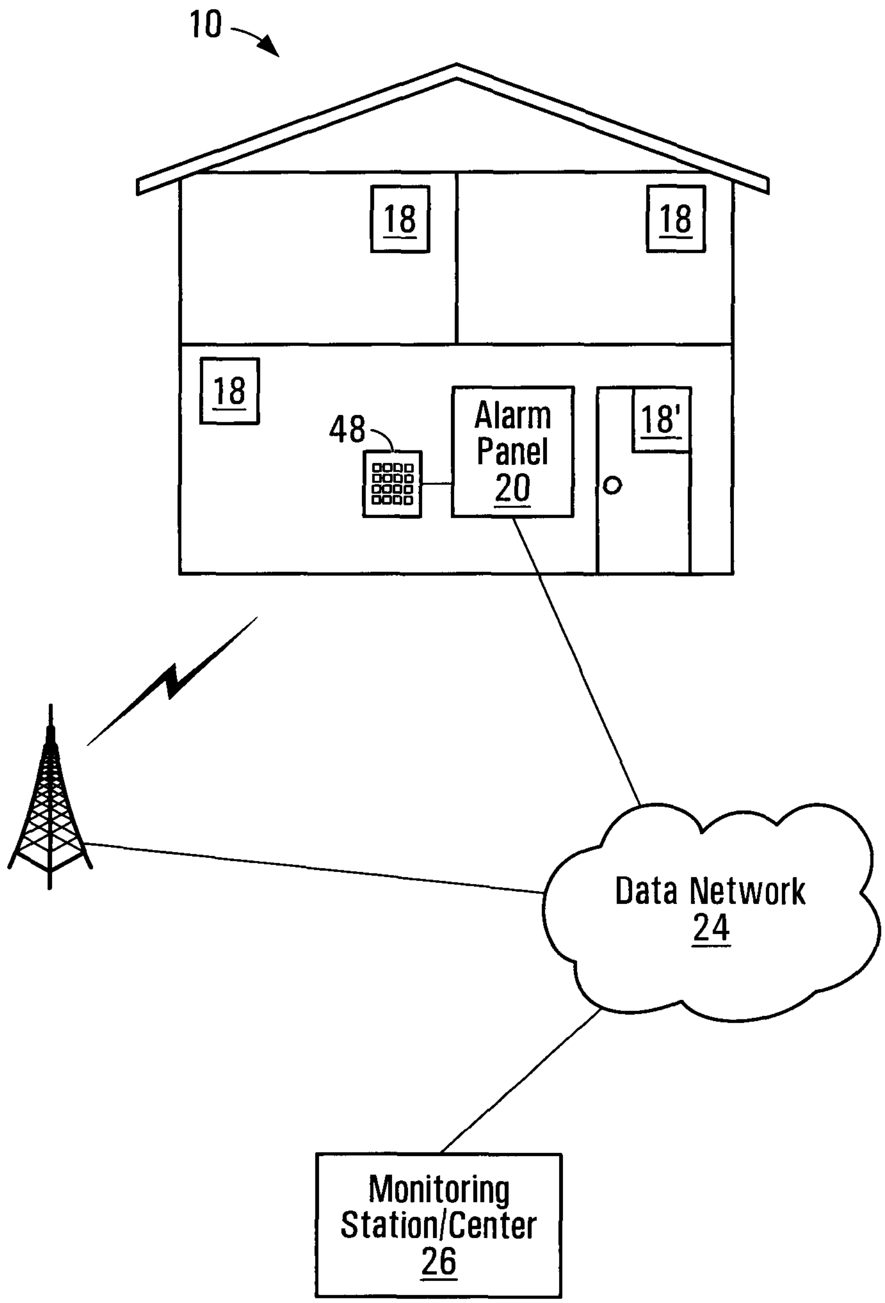
FIG. 1 is a schematic diagram of an alarm system at a premises, exemplary of an embodiment of the present invention.

FIG. 1 depicts an exemplary alarm system infrastructure 10 including an alarm system including alarm panel 20 at a customer premises 22 communicating through a data network 24 such as the Internet, with a central monitoring station 26 (also referred to as central monitoring center). As will be appreciated, data network 24 may include any combination of wired and wireless links capable of carrying packet switched traffic, and may span multiple carriers, and a wide geography. In one embodiment, data network 24 may simply be the public Internet. In another, data network 24 may include one or more wireless links, and may include a wireless data network, such as a 2G, 3G, 4G or LTE cellular data network. Panel 20 may be in communication with network 24 by way of Ethernet switch or router (not illustrated). Panel 20 may therefore include an Ethernet or similar interface, which may be wired or wireless. Further network components, such as access points, routers, switches, DSL modems, and the like possibly interconnecting panel 20 with data network 24 are not illustrated.

At residential or business premises 22, alarm panel 20 may be in communication with one or more detectors 18. Each of detectors 18 provides information regarding the status of the monitored premises to local alarm panel 20. Detectors 18 may include, for example, motion detectors, glass break detectors, noxious gas sensors, smoke/fire detectors, microphones and contact switches. In this way, detectors 18 may sense the presence of motion; glass breakage; gas leaks; fire; and/or breach of an entry point. Detectors 18 may be hard wired to alarm panel 20 or may communicate with alarm panel 20 wirelessly, in manners known to persons of ordinary skill in the art. Alarm panel 20 may further include other interfaces such as keypad 48, as well as sirens, and the like, not specifically shown in FIG. 1.

At least one detector—detector 18'—is proximate a point of entry for premises to detect entry through that access point. For example, detector 18' may be a contact switch or motion detector arranged to monitor entry through a door or other portal. Other detectors (not specifically illustrated), like detector 18', may also be proximate other points of entry.

Keypad 48 may be integral to panel 20, or may be separate therefrom and in communication with panel 20 by way of wired or wireless link. Typically, keypad 48 is in sufficient proximity to the entry/exit monitored by detector 18', allowing panel 20 to be disarmed and armed, as an occupant enters and leaves premises 22. In its armed state, the alarm system monitors possible alarm events using detectors 18 (and 18') and reports these to a monitoring station 26. In its disarmed state, the alarm system remains substantially inactive and does not sense alarm events or conditions, and/or does not react to sensed alarm conditions. Of course, keypad 48 could be replaced with some other peripheral, such as a biometric sensor, a magnetic card reader, an RFID interface, or the like.

Figure 2:
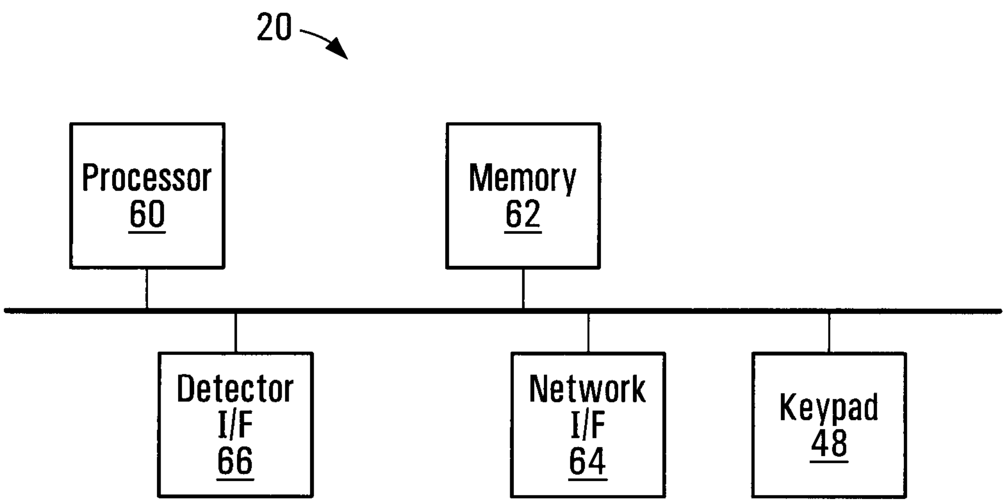
FIG. 2 is a schematic block diagram of a panel of the alarm system of FIG. 1, exemplary of an embodiment of the present invention.

As illustrated in FIG. 2, a typical alarm panel 20 includes a processor 60 in communication with memory 62; a detector interface 66 for communication with detectors 18 (and detector 18'); and a network interface 64 for communication with data network 24. Keypad 48 further forms part of panel 20 to allow entry of arming and disarming codes. Other components, such as a speaker, power supply, LCD/LED display and the like, may also form part of panel 20 but are not depicted. Optionally, panel 20 may include tamper sensors, and a back-up power supply such as a battery, allowing panel to operate even if it has been physically removed from where it is mounted. Further, optionally, panel 20 may allow for two-way voice communication between premises 22 and monitoring station 26.

Network interface 64 may be a standard network interface controller, and may provide wired or wireless data network access to network 24. In an embodiment, network interface 64 allows connection to network 24, on demand, over a cellular network connection. As such network interface 64 may be a GSM, 2G, 3G, 4G, LTE or similar cellular data network interface. A link to the cellular data network may be established on demand, as required and needs to be explicitly established prior to dispatch of any message over network 24 to monitoring station 26. Typically, establishing a connection to monitoring station 26, entails establishing a network connection over network 24 by opening a data session with the cellular network, obtaining a dynamically assigned IP address for communication, using for example the dynamic host configuration protocol (DHCP), or similar protocol. Once the network connection has been established, an Internet protocol (IP) socket may be opened to allow for dispatch of an IP datagram (e.g. a TCP/IP, UDP, or similar packet) over network 24. As will be appreciated, establishing a connection to the data network 24 and to monitoring station 26 may several seconds or even one or two minutes. Other connections to data network 24 may require similar establishment, and be associated with a delay. For example, if network interface 64 is in communication with a DSL modem configured for on-demand dialing, a similar time may be required to establish a connection to network 24.

Memory 62 stores program instructions and data used by processor 60 of alarm panel 20, to operate as described herein. Memory 62 may be a suitable combination of random access memory and read-only memory, and may host suitable program instructions (e.g. firmware or operating software), and configuration and operating data and may be organized as a file system or otherwise. Program instructions stored in memory 62 of panel 20 may further store software components allowing network communications and establishment of connections to data network 24. The software components may, for example include an internet protocol (IP) stack, as well as driver components for the various interface, including interfaces 64 and 66 and keypad 48. Other software components suitable for establishing a connection and communicating across network 24 will be apparent to those of ordinary skill.

Program instructions stored in memory 62 of alarm panel 20, along with configuration data may control overall operation of panel 20. In particular, program instructions control how panel 20, may be transitioned between its armed and disarmed states, and how panel 20 reacts to sensing a condition at a detector 18 (or 18') that may signify an alarm. Moreover, one or more data network addresses for signalling alarm conditions may be stored in memory 62 of alarm panel 20. These network addresses may include the network addresses (e.g. IP) by which monitoring station 26 may be reached. Alarm panel 20 may send data associated with sensed alarm conditions sensed at premises 22 to central monitoring station 26 over data network 24 using interface 64. The data may be packaged as alarm messages, as further detailed below. Example alarm panels may comprise DSC® models PC1864 and PC9155, SCW915x suitably modified to operate as described herein.

Figure 3:
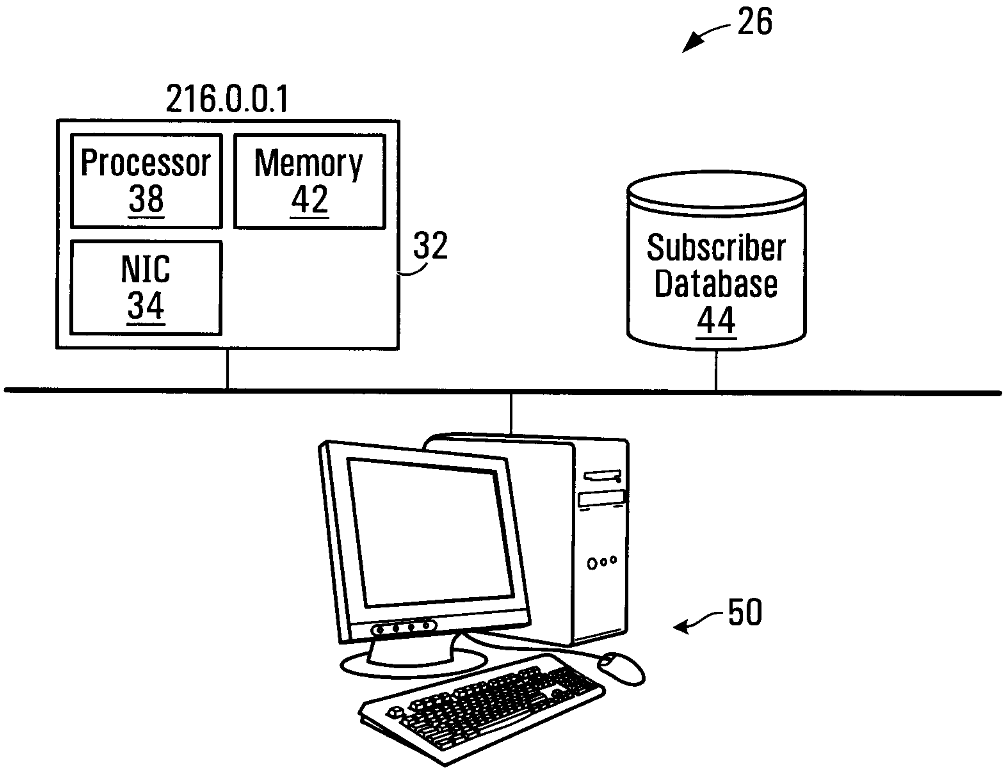
FIG. 3 is a schematic block diagram of a central monitoring station in the alarm system of FIG. 1.

Central monitoring station 26 is more particularly illustrated in FIG. 3. Monitoring station 26 is depicted as a single physical monitoring station or center in FIG. 1; however, it could alternatively be formed of multiple monitoring centers/stations, each at a different physical location, and each in communication with data network 24. In particular, in order to process a high volume of alarm conditions from a large number of subscribers, central monitoring station 26 includes one or more monitoring server(s) 32. Monitoring server 32 processes alarm messages from panels 20 of subscribers serviced by monitoring station 26. Optionally, monitoring server 32 may also take part in two-way audio communications or otherwise communicate over network 24, with a suitably equipped interconnected panel 20.

Monitoring server 32 may include a processor 38, network interface 34 and memory 42. Monitoring server 32 may physically take the form of a rack mounted card. Monitoring server 32 may be in communication with one or more operator terminals 50. An example monitoring server 32 may comprise a SURGARD™ SG-System III Virtual, or similar receiver.

Processor 38 of each monitoring server 32 acts as a controller for each monitoring server 32, and is in communication with, and controls overall operation, of each server 32. Processor 38 may include, or be in communication with memory 42 that stores processor executable instructions controlling the overall operation of monitoring server 32. Suitable software enabling each monitoring server 32 to process alarm messages may be stored within memory 42 of each monitoring server 32. Software may include a suitable Internet protocol (IP) stack and applications/clients.

Monitoring server 32 of central monitoring station 26 may be associated with an IP address and port(s) by which it can be contacted by alarm panels 20 to report alarm events over data network 24, and establish other IP connections. In the depicted embodiment, monitoring server 32 is associated with IP address 216.0.0.1. This address may be static, and thus always identify a particular one of monitoring server 32 to the computing devices, panels, etc. communicating over network 24. Alternatively, dynamic addresses could be used, and associated with static domain names, resolved through a domain name service. Network interface 34 may be a conventional network interface that interfaces with communications network 24 (FIG. 1) to receive incoming signals, and may for example take the form of an Ethernet network interface card (NIC). Terminal(s) 50 may be computers, thin-clients, or the like, to which received data representative of an alarm event is passed for handling by human operators. Each terminal 50 may include a monitor, a keyboard, microphone, and an audio transducer/speaker. An operator, at terminal 50 may further be able to establish outgoing telephone calls, to the police or third party security personnel. To that end, terminal 50 may be proximate a PSTN telephone, or may include or have access to voice-over-IP software (running at server 32, or elsewhere) allowing establishment of outgoing telephone calls to parties associated with the premises 20 (as identified in database 44), third parties, such as police, security personnel, or the like.

Monitoring station 26 may further include, or have access to, a subscriber database 44 that includes a database under control of a database engine. Database 44 may contain entries corresponding to the various subscribers, having panels like panel 20, serviced by monitoring station 26. Database 44 may, for example, include the names and addresses, phone number, contact phone number, for each subscriber at premises 22 (FIG. 1). As well, database 44 may include the particulars of each detector 18, the unique identifier of each panel 20 assigned to a particular subscriber; account information; and the like. Database 44 may further log or archive alarm data received from panel 20.

Monitoring station 26 receives and processes incoming alarm messages from panel 20. Extracted data from the incoming messages may, for example, be overhead, or alarm data. The alarm data may be passed to processor 38, which, in turn, may make decisions under software control based upon that data. In particular, processor 38 may be programmed to initiate certain alarm handling procedures based on the received data.

Figure 4:
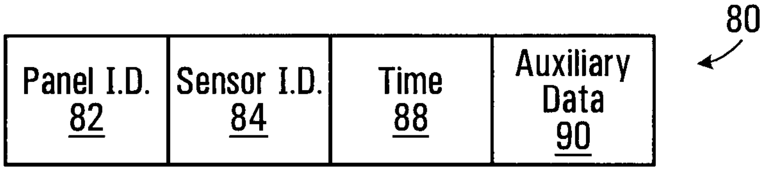
FIG. 4 is diagram depicting the format of alarm messages dispatched from the panel of FIG. 2.

The format of a sample alarm message 80 is illustrated in FIG. 4. As illustrated, an alarm message 80 may include a unique panel identifier field 82, a sensor identifier field 84, and a time stamp 88. Alarm message 80 may further include an auxiliary data field 90, and other data fields that are not illustrated. Database 44 stores records including the unique panel identifier of panels, such as panel 20 serviced by monitoring station 26, and included in field 82. Message 80 may additionally packaged as a TCP/IP or UDP packet, and may further include appropriate TCP or UDP overhead (source IP address, destination IP address, etc.).

For example, alarm data extracted from one or more incoming alarm messages may specify that a particular detector 18 at a particular monitored premises 22 was tripped. Processor 38 may be programmed to extract associated data from database 44 identifying the premises 22, and notify a human operator at a terminal 50 using the alarm data, for further action. Further action may include the human operator consulting, and calling, one of a list of phone numbers associated with that particular monitored premise, stored in database 44. Database 44 may, for example, include the telephone number(s) of the homeowner and occupants, and the operator may call the homeowner to determine what the problem is or was.

Now, prior to use panel 20 (FIG. 1) may be properly installed and configured at premises 22 by a qualified installer. Configuration of panel 20 may include installation of detectors 18, as well the programming of the network address of monitoring station 26. Additionally, detectors 18 (and 18') are paired with panel 20, and panel 20 is programmed to react to tripped detectors and dispatch alarm messages to monitoring station 26, as desired.

In particular, panel 20 may further be programmed to provide an entry delay for certain detectors—like detector 18'. As detailed below, for those detectors 18' for which panel 20 is programmed to provide an entry delay, an uninterrupted alarm messaging procedure will not conclusively signal an alarm resulting from a sensed condition (e.g. a tripped sensor) until the delay interval has expired. In this way, entry through an entry portal, like a door, need not give rise to an immediate alarm, but may instead allow provide an entrant a reasonable amount of time (as dictated by the entry delay) to disarm the alarm system, by entering a suitable disarm code, or using a key, or the like. Pairing and configuration parameters for detectors 18 (and 18') may be stored in memory 62 of panel 20. The identity of each sensor may be programmed at panel 20. Also, the desired entry delay, if any, may be programmed at panel 20. A configuration interface may be presented to an installer, using an audio interface, an LCD interface, or other interface at panel 20. Configuration may alternatively be accomplished remotely using a computing device to create a configuration file that may be installed at panel 20. Alternatively, a portable computing device could be connected panel 20 to allow configuration, in manners understood by those of ordinary skill.

At monitoring station 26, database 44 may be updated to include a record identifying particulars associated with each alarm panel 20 including the address of premises 22, the identity of the subscriber at premises 20, and one or more call-back phone numbers that may be used to reach contact individuals associated with panel 20. The phone numbers may be those of residents at premises 22, or alternate contact phone numbers including those of cell handsets 30. Each record of database 44 may further store the identity of other residents at premises 22, as well as their cellular telephone numbers.

Figure 5:
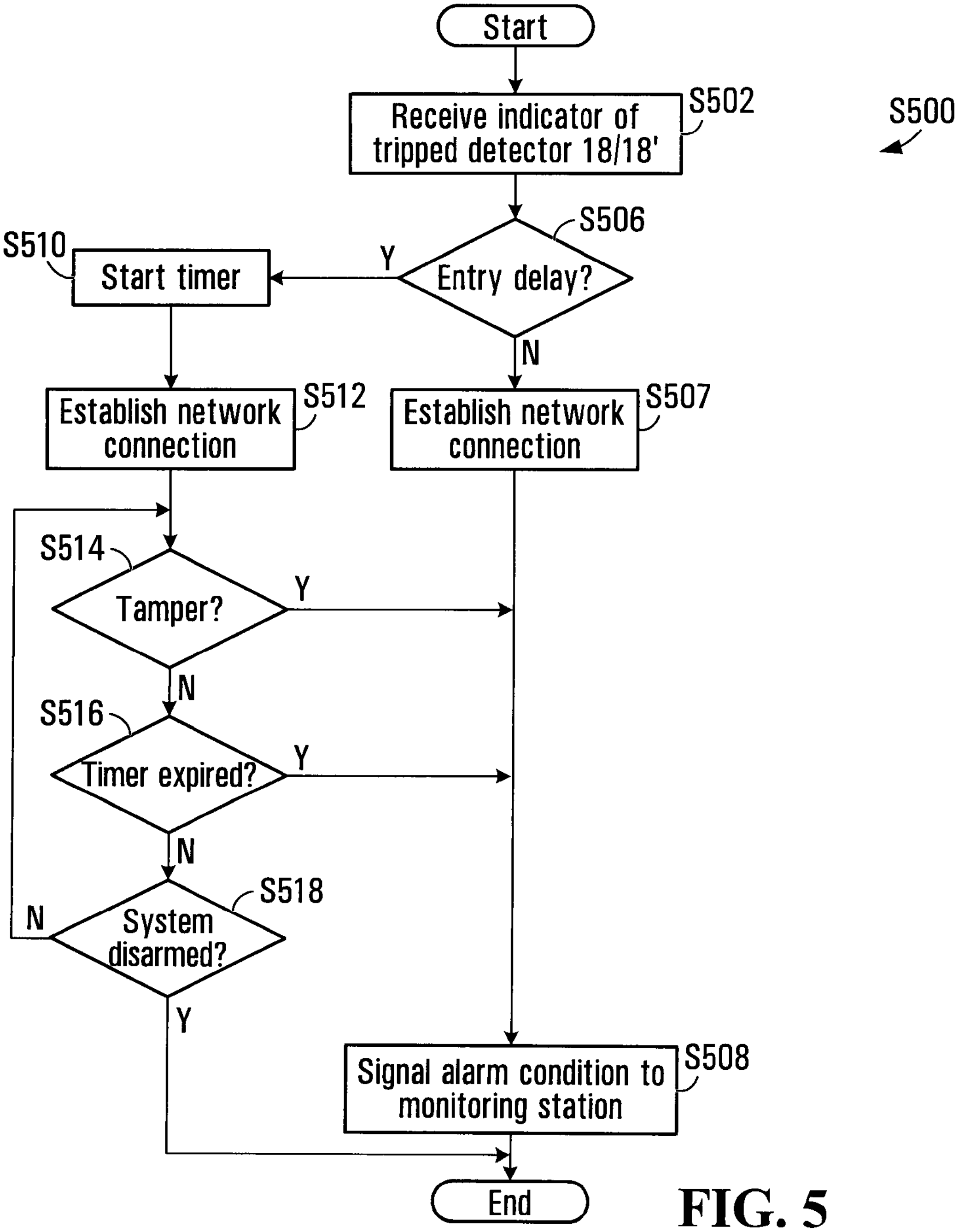
FIGS. 5 and 6 are flow diagrams depicting steps performed at the alarm panel and central monitoring station of FIGS. 1 and 3, respectively, exemplary of embodiments of the present invention.

In operation, blocks S500 performed in the presence of a potential alarm condition at premises 22 are illustrated in FIG. 5. As illustrated, a detector 18 (or 18'), provides an indicator of the sensed condition to panel 20, which is received in block S502. In response to receiving notification of the potential alarm condition in block S502, panel 20 immediately commences an alarm signalling procedure by commencing the establishment of a connection over network 24 to an assigned server 32 at central monitoring station 26, in block S512 or S507.

The network connection may be established after panel 20 determines if the sensed condition, sensed at sensor 18 or 18' is associated with an entry delay, in block S506. Processor 60, may for example, make this determination by retrieving configuration data from memory 62 for the tripped sensor 18/18'

If the sensed condition is not associated with an entry delay, panel 20 need not initiate an entry delay timer, and may simply establish a network connection in block S507, and generate an alarm message 80 (FIG. 4). The alarm message 80 may be dispatched in block S508 to the assigned monitoring server 32 for that panel 20, over the connection established in block S507. Each alarm message 80 includes at least an identifier of panel 20 originating the message and in field 82, and an identifier of the sensed condition/sensor 18 giving rise to the alarm condition in field 84. The alarm message 80 once received at monitoring server 32 is processed at the monitoring station 26 as described below. Alarm message 80 may be created by processor 60 using data stored in memory 62, including configuration data stored in memory 62 as a result of an installer's configuration of panel 20, as described above.

For example, if network interface 64 is a wireless network interface (e.g. a GSM or GPRS interface), a link to the cellular data network may be established as described above—a data channel may be opened; an IP address may be obtained; and an IP socket to server 32 by way of its assigned network address (e.g. IP address) may be created.

If, on the other hand, the sensed condition is associated with a delay, as determined in block S506, panel 20 starts an entry delay timer in block S510, for the defined delay interval. Again, the defined interval may be configurable or fixed. If configurable, the interval may be stored within memory 62 as a result of the installer's configuration. Example delay intervals may be between 1 and 255 seconds.

Prior to expiry of the delay timer, and typically immediately after starting the delay timer, panel 20 commences the alarm signalling procedure by commencing with the establishment of a connection over network 24 to the assigned server 32 at central monitoring station 26, in block S512.

Expiry of the timer commenced in block S510 may be monitored in block S516. Upon expiry of the timer, an alarm message 80 identifying the alarm condition is dispatched over the connection established in block S512. Conveniently, as the connection to network 24 was established in block S512, no further delay need be incurred.

If however, panel 20 has been disarmed, prior to expiry of the timer as determined in block S518, the alarm message dispatch procedure is terminated/aborted. Optionally, the connection established in block S512 may be taken down. For example, if the connection is a GPRS or GSM connection, the connection may be explicitly terminated. In alternate embodiments, disarming of panel 20 may simply result in terminations of bocks S500, resulting blocks S516 and onward simply not being performed. The connection to network 24 may simply expire after a period of inactivity.

Optionally, panel 20 may further include one or more tamper sensor(s) (e.g. a sensor that senses a change in physical orientation of panel 20 or keypad 48, a sensor that senses disconnection from a wall outlet; a sensor that senses tampering with the case holding panel 20; etc.). If a tamper sensor(s) is tripped while panel 20 is waiting for delay interval to expire, or to be disarmed, as sensed in block S514, the alarm message may be immediately dispatched over network 24, in block S508, without waiting for expiry of the delay timer in block S516, or disarmament in block S518. Otherwise, the delay timer may be allowed to expire, as described above.

Figure 6:
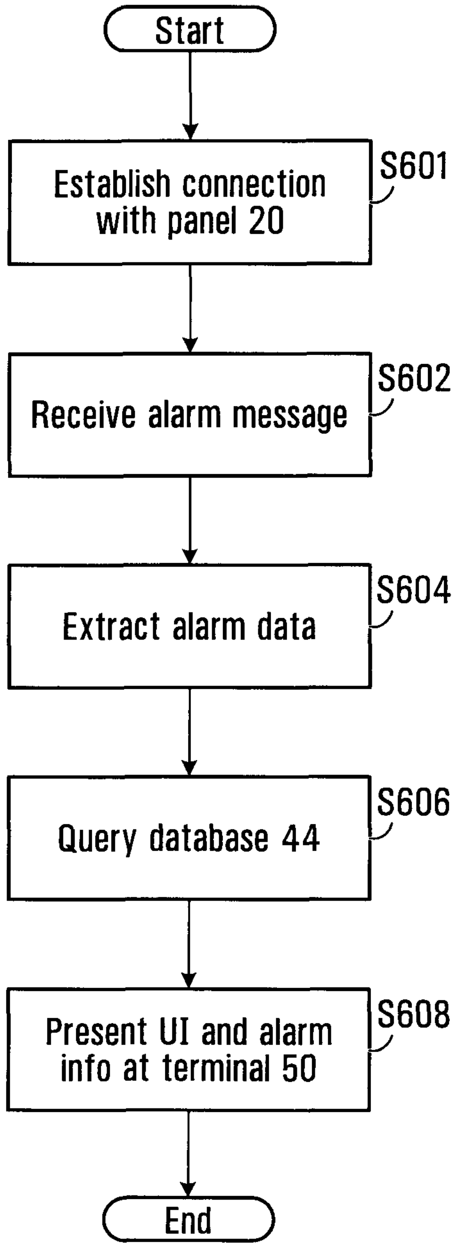

At monitoring station 26 received messages may be processed in blocks S600 as illustrated in FIG. 6. Specifically, the connection from panel to monitoring station established in block S512/S507, may be established at monitoring station S600 in block S601. An alarm message 80 may be received some time thereafter in block S602. Processor 38 of monitoring server 32, upon receipt of alarm message 80 in block S602 may extract alarm data from the message in block S604. Using the extracted data, processor 38 may identify the specific panel 20 from the contents of field 82, and extract corresponding data from database 44 in block S606. An operator at terminal 50 of monitoring station 26 may be presented with a user interface at terminal 50 in block S608 to allow the operator to see status information about a signalled alarm condition—including the address of the premises, identity of the tripped sensor, the name of the occupant(s), call-back numbers, etc. The user interface may be generated by software at terminal 50, or by or in conjunction with software at server 32. For example, a user interface may be provided as an HTML page using HTML code stored at server 32 and presented by a browser hosted at terminal 50. The user interface at terminal 50 could be presented using terminal emulation or custom software at terminal 50, or in any other way apparent to those of ordinary skill. In response, the operator at terminal 50, may contact emergency personnel (e.g. by telephone, network interconnection, or the like); call back the occupant; establish a two-way audio session with the premises, if supported at panel 20; log the alarm condition; or otherwise process the signalled alarm.

As will be appreciated, the above described embodiment does not require any modification to alarm handling procedures at monitoring station 26, and may be easily retrofitted to existing panels at premises 22. In yet further alternate embodiments, panel 20 may, after determining a sensed condition is associated with a delay interval, dispatch an initial alarm message—e.g. an potential alarm alert message—identifying that a condition has been sensed (e.g. after block S512 in FIG. 5), and after expiry of the delay interval (or upon panel disarmament) after block S518 send a further alarm cancellation message identifying that the panel 20 has been disarmed. If the alarm cancellation message is not received at station 26, central monitoring station 26 may treat and process the initial the potential alarm alert message, as a true alarm message in the same way as alarm message 80 is processed. Put another way, the initial message does not signal the alarm, but rather only signals a potential alarm. The alarm is only conclusively signalled one the cancellation message is not received. In this embodiment, software and/or procedures at monitoring station 26 would be suitably modified to handle a pre-alarm message and alarm notification cancellation messages from subscriber panels 20.

Conveniently, establishing a link to network 24, and a connection to station 26 prior to dispatching the alarm message conclusively signalling the alarm event, allows the alarm message to be quickly dispatched upon expiry of the entry interval. As establishment of the connection may take thirty seconds or more, the connection may be established during the entry delay interval, and may be ready immediately after the delay interval expires, or earlier in case. This increases the likelihood that an alarm message may be signalled if the alarm system or infrastructure has been, or is being tampered with after unauthorized entry. As required, the entry delay interval may be adjusted by an installer to take into account the typical time required to establish the network connection.

As will also be appreciated, any cumulative time reduction between sensing an alarm and signalling the alarm, while giving an authorized entrant the opportunity to disarm the alarm system, will decrease the likelihood that the alarm system or infrastructure has been tampered. To this end, if connection to monitoring station 26 is partially or wholly completed before the expiry of the entry delay timer, the cumulative time reduction between sensing an alarm and signalling the alarm may be reduced. As will be appreciated, even a network connection to the monitoring station that does not yet terminated at the monitoring station (e.g. a connection to the cellular network) may serve to reduce cumulative time reduction between sensing an alarm and signalling the alarm. Again, the entry delay timer may be suitably adjusted to take into account time taken to establish a network connection.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of signalling a sensed alarm condition from an alarm system at a premises to a monitoring station, said method comprising:

determining if said sensed alarm condition is associated with a disarm delay;

in response to determining that said sensed alarm condition is associated with a disarm delay, initiating a disarm delay timer;

prior to expiry of said disarm delay timer and in response to sensing said alarm condition, establishing a communications connection over a network to an alarm monitoring station, without dispatching a message signalling said sensed alarm condition; and upon expiry of said disarm delay timer and if said system has not been disarmed, dispatching a signal indicative of said sensed alarm condition to said alarm monitoring station over said connection, which has previously been established, wherein said establishing comprises at least one of establishing a connection to a cellular data network; obtaining a dynamically assigned IP address; and creating an IP socket to said monitoring station.

2. The method of claim 1, wherein said sensed alarm condition is an open entry point for said premises.

3. The method of claim 1, wherein said sensed alarm condition is an open entry point proximate a disarming interface for said alarm system.

4. The method of claim 3, wherein said disarming interface comprises a keypad mounted proximate said entry point.

5. The method of claim 1, wherein said disarm delay is between 1 and 60 seconds.

6. The method of claim 1, wherein said communications connection is a connection over a cellular telephone network.

7. The method of claim 1, further comprising terminating said communications connection if said alarm system has been disarmed.

8. The method of claim 1, further comprising dispatching a signal indicative of said sensed alarm condition to said alarm monitoring station over said communications connection, which has previously been established, if tampering with said alarm system is detected.

9. The method of claim 1, wherein said establishing comprises establishing a connection to cellular data network.

10. A method of operating an alarm system at a premises, said method comprising:

sensing an alarm event associated with an entry delay; and initiating a disarm timer;

upon sensing said alarm event, commencing an alarm message dispatch procedure that includes establishing a communications connection over a data network to an alarm monitoring station prior to expiry of said disarm timer, without dispatching a message conclusively signalling said alarm event; and aborting said alarm dispatch procedure prior to dispatching a message conclusively signalling said alarm event, if said alarm system is disarmed prior to expiry of said disarm timer;

upon expiry of said disarm timer and if said system has not been disarmed, dispatching a signal indicative of said alarm event to said alarm monitoring station over said connection, which has previously been established, wherein said establishing comprises at least one of establishing a connection to a cellular data network; obtaining a dynamically assigned IP address; and creating an IP socket to said monitoring station.

11. The method of claim 10, further comprising dispatching an alarm message indicative of a potential alarm condition at said premises prior to expiry of said disarm timer.

12. An alarm system for sensing and signalling sensed alarm conditions at a premises, said alarm system comprising:

at least one detector for sensing an alarm condition;

a panel in communication with said at least one detector, said panel comprising at least one processor and a network interface, said panel operable to:

determine if said sensed alarm condition is associated with a disarm delay;

in response to determining that said sensed alarm condition is associated with a disarm delay, initiate a disarm delay timer;

prior to expiry of said disarm delay timer and in response to sensing said sensed alarm condition, establish a communications channel with an alarm monitoring station, without dispatching a message signalling said sensed alarm condition;

upon expiry of said disarm delay timer and if said system has not been disarmed, dispatch a signal indicative of said sensed alarm condition to said alarm monitoring station over said communications channel, which has previously been established; and a peripheral for disarming said alarm system prior to expiry of said disarm delay timer.

13. The alarm system of claim 12, wherein said network interface comprises a cellular network interface.

14. The alarm system of claim 12, wherein said detector is proximate an entry point for said premises, and said sensed alarm condition is detected in response to entry through said entry point.

* * * * *

UNITED STATES PATENT AND TRADEMARK OFFICE

CERTIFICATE OF CORRECTION

PATENT NO. : 9,111,431 B2
APPLICATION NO. : 13/881089
DATED : August 18, 2015
INVENTOR(S) : Wu et al.

It is certified that error appears in the above-identified patent and that said Letters Patent is hereby corrected as shown below:

Title Page
(75) Inventors: "Rajeshwar D. Bishundeo, Concord, CA (US)" should read -- Rajeshwar D. Bishundeo, Concord (CA) --

Signed and Sealed this
Nineteenth Day of April, 2016

Michelle K. Lee
*Director of the United States Patent and Trademark Office*